United States Patent

[11] 3,632,190

| [72] | Inventor | Yoshiyuki Shimizu<br>Kawasaki-shi, Japan |
|---|---|---|
| [21] | Appl. No. | 859,347 |
| [22] | Filed | Sept. 19, 1969 |
| [45] | Patented | Jan. 4, 1972 |
| [73] | Assignee | Nippon Kogaku K.K.<br>Tokyo, Japan |
| [32] | Priority | Sept. 24, 1968 |
| [33] | | Japan |
| [31] | | 43/68288 |

[54] CATADIOPTRIC TELEPHOTO OBJECTIVE LENS SYSTEM
3 Claims, 7 Drawing Figs.

| [52] | U.S. Cl. | 350/201 |
|---|---|---|
| [51] | Int. Cl. | G02b 17/08 |
| [50] | Field of Search | 350/201, 199, 200 |

[56] References Cited
UNITED STATES PATENTS

| 3,490,831 | 1/1970 | Takahashi | 350/201 |
|---|---|---|---|
| 2,730,926 | 1/1956 | Back et al. | 350/201 |
| 2,817,270 | 12/1957 | Mandler | 350/201 |

*Primary Examiner*—John K. Corbin
*Attorney*—Harry G. Shapiro

ABSTRACT: This invention provides a reflecting-refracting, i.e. catadioptric, telephoto lens of F/7 and having an angle of field of 5°. The lens system comprises a positive meniscus lens having a convex surface directing toward an object, a main reflecting mirror of concave back surface having a refracting surface and a reflecting surface, an additional mirror of convex back surface placed near to said positive meniscus and having a refracting surface and a reflecting surface, and a concave lens cemented to said reflecting mirror through a positive lens placed therebetween and having a concave surface directing toward the object. The central portion of the main reflecting mirror is not reflecting; it allows the passage of light. The composite focal length of the negative lens, positive lens and the main mirror is negative when the light rays pass therethrough and the assembled length of the system is less than 1/3.5 of the focal length of the whole system.

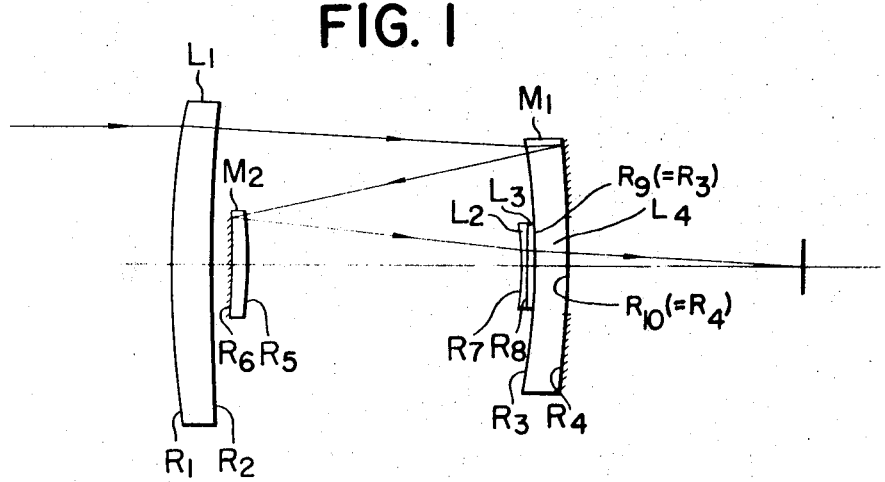

FIG. 3A
SPHERICAL ABERRATION SINE CONDITION

FIG. 3B
ASTIGMATISM

FIG. 3C
DISTORTION

— SPHERICAL ABERRATION
--- SINE CONDITION
— SAGITTAL
--- MERIDIONAL

ð3,632,190

CATADIOPTRIC TELEPHOTO OBJECTIVE LENS SYSTEM

The present invention provides an improved reflecting-refracting telephoto objective lens.

The reflecting-refracting, i.e., catadioptric, telephoto objective lens combining reflecting mirrors and lenses is advantageously used for photographic or telephoto objective lens since it has such an advantage as to reduce the overall length of the lens and minimizing the chromatic aberration and so on. However, there are many instances in which an aperture is necessary to be provided at the central portion of a main mirror for passing light rays. When a glass material is used for the main mirror, it is very difficult to work out such an aperture. Moreover, when a mirror having an aperture is polished, the mirror surface is deteriorated in precision, the accuracy of measurement of the thickness of the center portion of the mirror is decreased, and it is inevitable that the center of the aperture, when it is worked, becomes deviated from the optical axis of the mirror. On the other hand, when an aperture is worked after the mirror surface has been polished, the mirror surface will be deformed due to the working. Thus it is very difficult to provide an aperture in the mirror from the view point of machining and the deterioration in accuracy could hardly be avoided. Furthermore, it is usual that the magnitude of the power of a reflecting surface is far larger than that of a refractive surface having the same radius of curvature as that of the reflecting surface, so that the accuracy of a reflecting mirror, especially a main mirror significantly affects the performance of the whole optical system.

The principal object of this invention is to provide a catadioptric telephoto objective system of the type in which an aperture is not provided at the center of a main mirror but the light rays are passed through that portion without applying a reflecting plating at that portion so as to improve the accuracy of the reflecting surface and improve the performance of the whole optical system.

This invention provides a catadioptric telephoto objective having F/7 and an angle of field of 5°. Reflecting mirrors are widely used not only in astronomic telescopes but also in photographic and other objectives having long focal length. Generally, the surface reflecting mirror having a spherical surface is free from chromatic aberration but it has a spherical aberration and a turbulence in sine condition, i.e., coma. For correcting coma, the well-known Schmidt correcting plate is used. However, the system utilizing such correcting plate is not suitable for photographic objectives from the standpoint of its construction. Another method for correcting this defect of the surface reflecting mirror is the use of Maksutov reflecting objective system in which a negative lens having strongly bending concentric first and second spherical surfaces is placed in front of a main mirror. However, the Maksutov system has a diaphragm at the center of the reflecting spherical surface so that this system is not suitable as a photographic objective, and moreover, it is not possible to attain a wide angle of field. Furthermore, the negative lens is spaced apart forwardly from the reflecting mirror by a relatively long distance. As a result, the light rays tend to diverge before they reach the reflecting mirror so that the diameter of the reflecting mirror must be larger than that of the entrance pupil. Thus, the volume of the optical system is unduly increased and so is the weight of the metallic parts.

The optical system of this invention comprises, in accordance with the advance of the light rays, a positive meniscus having a convex surface toward an object, a reflecting mirror of concave back surface having a surface for refracting light rays and concave toward the object and having a surface for reflecting light rays, a mirror of convex back surface placed near to said positive meniscus and having a surface for refracting light rays and convex toward the object and a surface for reflecting light rays, and a concave lens cemented to said reflecting mirror through a positive lens placed therebetween and having a concave surface toward the object and the central portion of said reflecting mirror being made to pass the light rays.

The present invention will be described more in detail referring to an illustrative embodiment shown in the accompanied drawing, in which:

FIG. 1 shows a cross section of an illustrative embodiment of this invention;

FIG. 2 shows aberration curves of example 1, FIG. 2A showing spherical aberration and sine condition, FIG. 2B showing astigmatism and FIG. 2C showing distortion; and FIG. 3 shows aberration curves of examples 2, FIG. 3A showing spherical aberration and sine condition, FIG. 3B showing astigmatism and FIG. 3C showing distortion.

In FIG. 1, which shows an illustrative embodiment of this invention, $L_1$ is a positive meniscus lens, of which convex surface directing toward an object. Since the lens $L_1$ is positive, the light rays have been converged as they arrive at a main reflecting mirror $M_1$ so that the diameter of the main mirror $M_1$ could advantageously be smaller than the diameter of the entrance pupil. The convex surface of the positive meniscus lens $L_1$ should be directed toward the object for correcting the curving of the image surface to the negative direction due to the fact the entrance pupil of the system is positioned behind the positive meniscus lens $L_1$ and the system must cover a relatively large angle field of 5° as for a reflecting telephoto system. The main mirror, i.e., the reflecting mirror $M_1$ of concave back surface, has a concave light refracting surface $R_3$ and a concave light reflecting surface $R_4$, the radius of curvature of the surface $R_3$ being smaller than that of the surface $R_4$. An additional mirror, i.e., a reflecting mirror $M_2$ of convex back surface, has a convex light refracting surface $R_5$ and a convex light reflecting surface $R_6$, the radius of curvature of the surface $R_5$ being smaller than that of the surface $R_6$. The additional mirror $M_2$ is placed near to the positive meniscus lens $L_1$.

There are the following conditions among the surfaces $R_3$ and $R_4$ and $R_5$ and $R_6$.

$$1.3 < (R_4)/(R_3) < 1.8$$
$$1.3 < (R_6)/(R_5) < 1.9$$

These conditions are necessary to correct the spherical aberrations and the turbulences of sine condition, i.e., coma, of the main and additional mirrors $M_1$ and $M_2$. By these conditions it is possible to obtain F/7 lens, and it enables to converge the light rays from the lens $L_1$ by significantly reflecting and refracting them at the mirror $M_1$ and subsequently diverge the light rays by the additional mirror $M_2$. This shows that it is possible to minimize the dimension of the whole optical system; and actually, in accordance with the present invention, the assembled length of the optical system is below 1/3.5 of the focal length of the whole system. If the lower limits of the above conditions are exceeded, shortage of correction of the spherical aberration produced by the reflecting surface is brought about, while, if the upper limits of the above conditions are exceeded, over correction of the spherical aberration produced by the reflecting surface is obtained, so that it is not possible to obtain a good final image. Next, there are provided a negative lens $L_2$, of which the concave surface is directed toward the object, and a positive lens $L_3$. The negative lens $L_2$ is cemented to the main mirror $M_1$ through the positive lens $L_3$ located therebetween.

The central portion of the main mirror $M_1$ is not reflecting plated so that the light rays arrive at the image surface after being reflected by the mirror $M_2$ and passing through lenses $L_2$ and $L_3$ and the main mirror $M_1$. The concave surface of the negative lens $L_2$ directing toward the object has an effect to smoothly refract the light rays since when the light rays, which should arrive at the periphery of the image surface, pass the lens $L_2$, they have already been far departed from the optical axis. In this embodiment, the composite focal length of the lenses $L_2$ and $L_3$ and the mirror $M_1$ is negative so that it aims not only to minimize the optical system by enlarging the image produced by the system before the additional mirror $M_2$ and increasing the focal length of the whole system, but also to curve the image surface in the positive direction to obtain an excellent final image. The positive lens $L_3$ mainly corrects the magnification chromatic aberration and it does not so much contribute the improvement of the performance of the lens system.

According to the above-mentioned lens constitution and the given conditions, the catadioptric telephoto optical system of small size and light weight is obtained with highly corrected aberrations.

The examples 1 and 2 and their Seidel coefficients are shown in the following tables and FIGS. 2A, 2B and 2C, and FIGS. 3A, 3B and 3C show spherical aberration and sine condition, astigmatism and distortion of examples 1 and 2, respectively.

EXAMPLE 1

| | $f=100.0$ | Thicknesses and Separations | $n_d$ | $\nu d$ |
|---|---|---|---|---|
| $L_1$ | $R_1=+46.264$ | $t=2.200$ | 1.5245 | 59.6 |
| | $R_2=+124.080$ | $s=17.300$ | | |
| $M_1$ | $R_3=-36.552$ | $t=1.760$ | 1.54072 | 47.2 |
| | $R_4=-57.800$ | $s=15.380$ | | |
| $M_2$ | $R_5=-23.166$ | $t=0.780$ | 1.54814 | 45.9 |
| | $R_6=-35.719$ | $s=14.740$ | | |
| $L_2$ | $R_7=-12.466$ | $t=0.220$ | 1.56883 | 56.0 |
| | $R_8=\infty$ | | | |
| $L_3$ | | $t=0.440$ | 1.72825 | 28.3 |
| $L_4$ | $R_9(=R_3)=-36.552$ | $t=1.760$ | 1.54072 | 47.2 |
| | $R_{10}(=R_4)=-57.800$ | | | |

Seidel coefficients of Example 1.—$f=1.00$

| | I | II | III | IV | V |
|---|---|---|---|---|---|
| 1 | 2.279088 | -0.995710 | 2.048707 | 1.178676 | -0.514951 |
| 2 | 0.001267 | 0.016098 | 0.336089 | -0.072823 | 0.0924917 |
| 3 | -7.699772 | 8.156537 | -26.881343 | -9.600546 | 10.170069 |
| 4 | 5.180716 | -6.855492 | 24.969189 | 6.825838 | -9.032435 |
| 5 | 0.345348 | -0.916857 | 6.342288 | 1.473998 | -3.913288 |
| 6 | -0.711047 | 1.659380 | -10.089180 | -2.344143 | 5.470560 |
| 7 | -2.258219 | 3.127993 | -9.381542 | -0.716003 | 0.991779 |
| 8 | 3.929575 | -3.951553 | 13.449336 | 5.502029 | -5.532801 |
| 9 | -1.111916 | -0.126242 | -2.951569 | -2.922903 | -0.331853 |
| 10 | -0.005352 | -0.031327 | -0.550090 | -0.183363 | 1.073252 |
| 11 | -0.030391 | -0.056814 | 0.511311 | 0.298888 | -0.558759 |
| 12 | 0.123608 | -0.328477 | 3.225885 | 1.480085 | -3.933198 |
| Σ | 0.103687 | -0.239810 | 1.029079 | 0.919734 | -7.036543 |

EXAMPLE 2

| | $f=100.0$ | Thicknesses and Separations | $n_d$ | $\nu d$ |
|---|---|---|---|---|
| $L_1$ | $R_1=+45.730$ | $t=2.2$ | 1.51823 | 59.0 |
| | $R_2=+122.760$ | $s=17.74$ | | |
| $M_1$ | $R_3=-36.856$ | $t=1.760$ | 1.54072 | 47.2 |
| | $R_4=-57.800$ | $s=15.84$ | | |
| $M_2$ | $R_5=-23.166$ | $t=0.78$ | 1.54814 | 45.9 |
| | $R_6=-34.500$ | $s=15.18$ | | |
| $L_2$ | $R_7=-10.640$ | $t=0.22$ | 1.52450 | 59.6 |
| | $R_8=\infty$ | | | |
| $L_3$ | | $t=0.44$ | 1.72825 | 28.3 |
| $L_4$ | $R_9(=R_3)=-36.856$ | $t=1.76$ | 1.54072 | 47.2 |
| | $R_{10}(=R_4)=-57.800$ | | | |

Seidel coefficients of Example 2.—$f=1.00$

| | I | II | III | IV | V |
|---|---|---|---|---|---|
| 1 | 2.350952 | -1.195439 | 2.570033 | 1.354292 | -0.688646 |
| 2 | 0.001541 | 0.017369 | 0.309139 | -0.082323 | -0.927694 |
| 3 | -7.480726 | 8.411761 | -29.328236 | -10.410897 | 11.706613 |
| 4 | 5.176599 | -7.162357 | 27.483735 | 7.664020 | -10.603959 |
| 5 | 0.394915 | -1.026595 | 7.053783 | 1.716443 | -4.461955 |
| 6 | -0.798807 | 1.837203 | -11.147957 | -2.697068 | 6.203078 |
| 7 | -2.098611 | 3.082322 | -9.836867 | -0.782583 | 1.149414 |
| 8 | 3.392811 | -3.726736 | 13.808056 | 5.621903 | -6.175218 |
| 9 | -0.882207 | -0.347697 | -3.644589 | -3.370548 | -1.328270 |
| 10 | -0.006795 | 0.042217 | -0.786834 | -0.262278 | 1.629430 |
| 11 | 0.022928 | -0.049828 | 0.520260 | 0.300812 | -0.662404 |
| 12 | 0.095121 | -0.289115 | 3.243437 | 1.485935 | -4.516426 |
| Σ | 0.167330 | -0.406896 | 0.244859 | 0.537708 | -8.676037 |

It is believed that the advantages and improved results furnished by the telephoto objective lens system of the invention will be apparent from the foregoing detailed description of the preferred embodiments of the invention. It will be apparent that various changes and modifications may be made without departing from the spirit and scope of the invention as sought to be defined in the claims.

I claim:

1. A catadioptric telephoto objective system lens comprising, viewing from the advance of the light, a positive meniscus lens ($L_1$) having a convex surface directed toward an object, a main reflecting mirror ($M_1$) having a central portion to allow the passage of light, said mirror having a light refracting surface concave toward an object and a concave light reflecting back surface of longer radius than said concave refracting surface, a second mirror ($M_2$) having a smaller diameter than the diameter of the main reflecting mirror and the diameter of the positive meniscus lens ($L_1$), said second mirror ($M_2$) being adjacent the positive meniscus lens ($L_1$) and having a convex light refracting surface facing the main reflecting mirror and a convex light reflecting back surface of longer radius than said convex refracting surface, and a negative lens ($L_2$) cemented to a positive lens ($L_3$) which in turn is in contact with the central portion of the concave light refracting surface of the main reflecting mirror ($M_1$), the negative lens ($L_2$) having a concave surface directed toward an object, the composite focal length of the lenses ($L_2$), ($L_3$) and the mirror ($M_1$) being negative when the light rays pass therethrough and the assembled length of the optical system being less than 1/3.5 of the focal length of the whole system.

2. A catadioptric objective system lens according to claim 1, wherein the elements of the system referred to in claim 1 have the following numerical values:

| | $f=100.0$ | Thickness and Separations | $n_d$ | $\nu d$ |
|---|---|---|---|---|
| $L_1$ | $R_1=+46.264$ | $t=2.200$ | 1.5245 | 59.6 |
| | $R_2=+124.080$ | $s=17.300$ | | |
| $M_1$ | $R_3=-36.552$ | $t=1.760$ | 1.54072 | 47.2 |
| | $R_4=-57.800$ | $s=15.380$ | | |
| $M_2$ | $R_5=-23.166$ | $t=0.780$ | 1.54814 | 45.9 |
| | $R_6=-35.719$ | $s=14.740$ | | |
| $L_2$ | $R_7=-12.466$ | $t=0.220$ | 1.56883 | 56.0 |
| | $R_8=\infty$ | | | |
| $L_3$ | | $t=0.440$ | 1.72825 | 28.3 |
| $L_4$ | $R_9(=R_3)=-36.552$ | $t=1.760$ | 1.54072 | 47.2 |
| | $R_{10}(=R_4)=-57.800$ | | | | where $f$ is the focal length of the system, $R$ is the radius of curvature of the indicated elements, and $L_4$ is the central portion of the main reflecting mirror ($M_1$).

3. A catadioptric objective system lens according to claim 1, wherein the elements of the system referred to in claim 1 have the following numerical values:

| | $f=100.0$ | Thickness and Separations | $n_d$ | $\nu d$ |
|---|---|---|---|---|
| $L_1$ | $R_1=+45.730$ | $t=2.2$ | 1.51823 | 59.0 |
| | $R_2=+122.760$ | $s=17.74$ | | |
| $M_1$ | $R_3=-36.856$ | $t=1.760$ | 1.54072 | 47.2 |
| | $R_4=-57.800$ | $s=15.84$ | | |
| $M_2$ | $R_5=-23.166$ | $t=0.78$ | 1.54814 | 45.9 |
| | $R_6=-34.500$ | $s=15.18$ | | |
| $L_2$ | $R_7=-10.640$ | $t=0.22$ | 1.52450 | 59.6 |
| | $R_8=\infty$ | | | |
| $L_3$ | | $t=0.44$ | 1.72825 | 28.3 |
| $L_4$ | $R_9(=R_3)=-36.856$ | $t=1.76$ | 1.54072 | 47.2 |
| | $R_{10}(=R_4)=-57.800$ | | | | where $f$ is the focal length of the system, $R$ is the radius of curvature of the indicated elements, and $L_4$ is the central portion of the main reflecting mirror ($M_1$).

* * * * *